United States Patent Office 3,263,082
Patented July 26, 1966

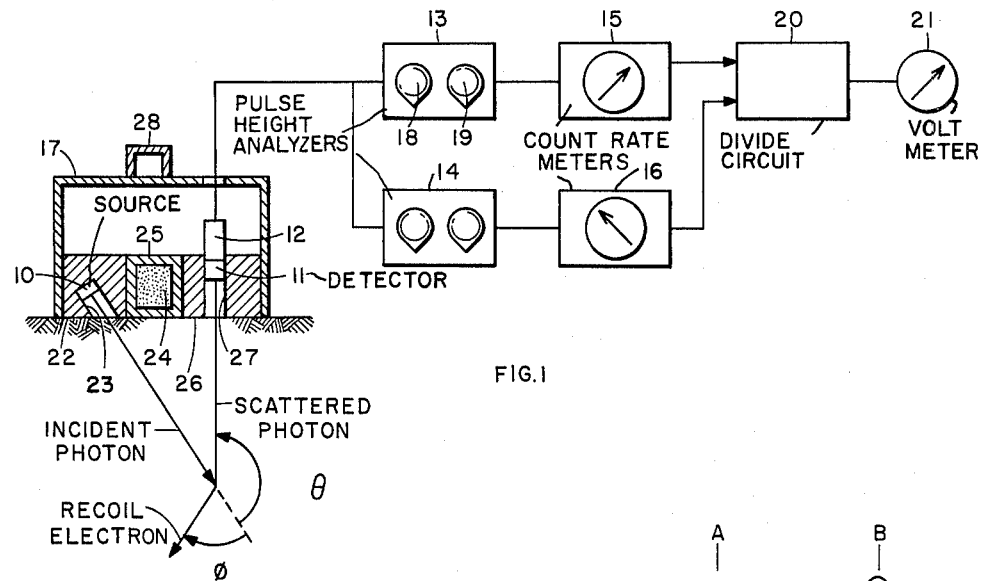
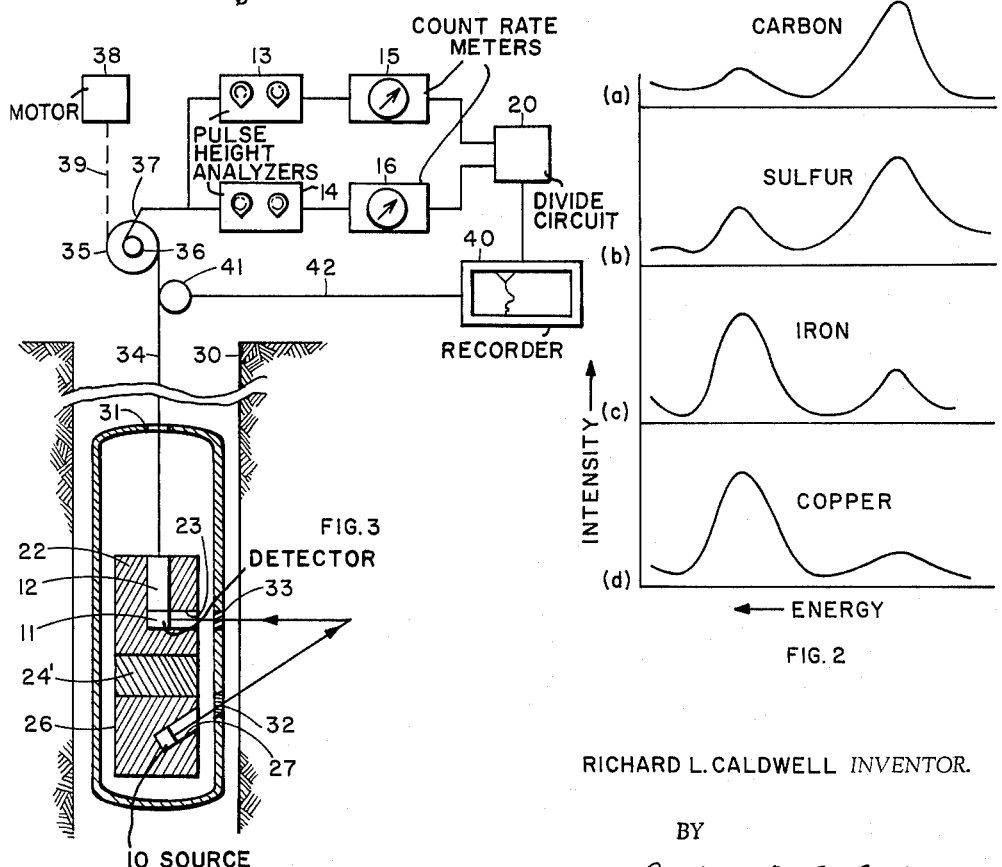

3,263,082
GEOLOGICAL PROSPECTING COMPRISING DIRECTIONAL IRRADIATION AND DETECTION
Richard L. Caldwell, Dallas, Tex., assignor to Mobil Oil Corporation, a corporation of New York
Filed June 17, 1963, Ser. No. 288,134
5 Claims. (Cl. 250—83.3)

This invention relates to prospecting for minerals and more particularly to prospecting by radiation analysis and has for an object the provision of an improved method of determining the nature of the elements in the formations by radiation analysis.

In conventional methods of prospecting for minerals in surface formations, samples are obtained and sent to the laboratory for analysis in order to identify the elements in the formations. This method of prospecting has disadvantages in that it is time consuming and costly. Thus, from a standpoint of economy and efficiency, it is desirable to provide a rapid method of analyzing the formations for elements of interest.

In accordance with the present invention, an improved method is provided for rapidly analyzing, at the site of exploration, the elements in the formations of interest. More particularly, the geological formations of interest to be analyzed are irradiated in a predetermined direction with radiation of a predetermined low energy. Radiation scattered by the elements is detected at a given angle relative to the direction at which the formations are irradiated. A first function is produced which is representative of the intensity of the scattered radiation detected at an energy value substantially the same as the energy of the radiation emitted by the source. A second function is produced which is representative of the intensity of scattered radiation detected at an energy level less than the energy of the radiation emitted by the source and determined in part by the angle of scattering. The magnitude of the two functions is compared to identify the elements in the formations of interest. For example, a relatively large ratio of the magnitude of the first function compared to that of the second function identifies the presence of heavy elements in the formations. A relatively small ratio, on the other hand, indicates the presence of light elements.

In accordance with a more specific aspect of the present invention, a detecting system is provided which produces pulses having a magnitude proportional to the energy of the scattered radiation detected. These pulses are selected according to their magnitude to produce simultaneously the first and second functions representative of the energy of the scattered radiation detected at the two energy levels of interest.

For further aspects and advantages of the present invention and for a more complete understanding thereof, reference may be had now to the following detailed description taken in conjunction with the accompanying drawings wherein:

FIGURE 1 illustrates a system for analyzing the elements near the surface of the earth;

FIGURE 2 illustrates curves useful in understanding the invention; and

FIGURE 3 illustrates a modification whereby the system of FIGURE 1 may be employed to analyze the elements in the formations traversed by a borehole.

Referring now to FIGURE 1, there will be described a system for determining the nature of the elements in the formations next to the surface of the earth. The elements of interest, for example, may be some of the heavier elements, tin or barium. The system includes a low energy radiation source 10 and detector 11 positioned in container 17 which is moved along the surface in the prospecting operations. The source 10 is positioned to irradiate the formations in a predetermined direction with radiation predominantly of a predetermined energy. The radiation scattered by the elements in a direction $\theta$ is detected by the detecting system which includes a scintillation crystal 11 coupled to a photomultiplier tube 12. The photomultiplier tube 12 converts the scintillations from the crystal into electrical pulses having magnitudes proportional to the energy of the radiation detected. The output of the photomultiplier tube 12 is applied to two single channel pulse height analyzers 13 and 14 which are coupled respectively to two count rate meters 15 and 16. The analyzer 13 is adjusted to be responsive only to the radiation detected having an energy level which is substantially the same as the energy of the radiation emitted by the source 10. The analyzer 14 is adjusted to be responsive only to the radiation detected having an energy level less than that of the radiation emitted by the source and dependent in part upon the scattering angle $\theta$. The count rate meter 15 thus indicates the intensity of the radiation detected at the higher energy level, and the count rate meter 16 indicates the intensity of the radiation detected at a lower energy level. The intensities of the scattered radiation detected at the two energy levels are thus simultaneously measured and are compared to determine the nature of the elements below the surface. For example, if meter 15 indicates a high intensity and meter 16 indicates a low intensity, it can be determined that heavy elements are present in the surface. This is due to the following reasons.

When an incident photon interacts with an electron bound in one of the shells of an atom, the photon may be scattered, for example, in the angle $\theta$ as illustrated in FIGURE 1. If upon impact, the electron is ejected from the atom, there will be a transfer of momentum and energy from the photon to the electron and the electron will recoil, for example, at an angle $\phi$. The energy of the recoiling electron is thus taken from that of the incident photon, leaving a scattered photon which has less energy. This is well known as the Compton effect. The energy of the degraded photon, scattered at a particular angle $\theta$, can be calculated from the well-known equation:

$$E' = \frac{E}{1 + (E/m_0c^2)(1 - \cos\theta)} \tag{1}$$

where E is the energy of the incident photon; E' is the energy of the scattered photon; $m_0$ is the rest mass of an electron; and c is the velocity of light.

In some instances, especially in the case of heavy atoms, the electron is so firmly bound within the atom that the impulse imparted by the photon is insufficient to eject it, and the atom, in its final condition, has the same energy as in the beginning so that no energy is removed from the photon. Thus, the scattered photons also may exhibit a relatively high intensity at the energy level of the incident photons. The relative intensities of the scattered photons at the energy level of the incident photons and at a lesser energy level determined by Equation 1 are dependent upon the nature of the atoms irradiated. For light atoms, in which the electrons are loosely bound, the intensity of the scattered photons at the lesser energy level will be greater than the intensity of the scattered photons at the energy of the incident photons. For heavy atoms, however, in which most of the electrons are firmly held, the opposite effect is observed. This phenomenon is illustrated by the energy spectra of FIGURES 2(a)-(d) for a given angle of scattering. For further treatment of this subject, reference may be had to X-rays in Theory and Experiment by Arthur H. Compton and Samuel K. Allison, D. Van Nostrand Company, New York, 1935, pages 200–211.

From FIGURE 2 it can be seen that as the atomic number increases, the intensity at the energy level of the incident photons, illustrated at A, increases relative to that at the lesser energy level, shown at B. In accordance with the system of the present invention, a conventional and compact low energy radiation source, such as a capsuled radioactive X-ray or gamma ray source, and a detecting system comprising a scintillation crystal detector coupled to a photomultiplier tube are employed to make use of this phenomenon to conveniently and rapidly analyze the earth formations. By a radioactive X-ray source is meant, for example, a K-capture radioisotope which, as is well known, emits its own characteristic K X-rays as part of the K-capture reaction.

In carrying out the prospecting operations, the source and detector, located in container 17, are positioned adjacent the surface to be investigated. A handle 28 is provided for locating the container at the desired position. Thus, samples need not be removed for analysis. Furthermore, with the use of the type of detector disclosed, pulse height analyzers and count rate meters may be employed to simultaneously measure the intensity of the radiation detected at the two energy levels. More particularly, lower threshold control 18 and window width control 19 are adjusted whereby the analyzer 13 is responsive only to the electrical pulses from the photomultiplier tube 12 which are representative of the energy of the radiation detected at the energy level of the radiation emitted by the source 10. Analyzer 14 is adjusted in a same manner to be responsive to the desired lower energy level determined in part by the angle of scattering as indicated by Equation 1. Meters 15 and 16 integrate the output of analyzers 13 and 14 for the production of intensity measurements.

To more specifically identify the elements, the ratios of the two intensities can be determined and compared with ratios previously obtained from the elements. The ratios can be calculated or determined with the use of system 20 which divides the integrated output voltage of meter 15 by that of meter 16. The ratio of these voltages is indicated by volt meter 21. The following ratios, for example, would indicate the presence of the following elements: 0.18 for carbon; 0.52 for sulphur; 1.96 for iron; 4.76 for copper; and increasing values for heavier elements. These ratios are only illustrative and depend upon the energy of the incident radiation and the angle of scattering.

For optimum result, the radiation emitted by the source should be predominantly of a single energy (monoenergetic) and at a relatively low energy level, preferably between 20 kev.–100 kev. If the energy of the incident radiation is too high, for example, the intensity of the radiation detected at the two energy levels may not vary with the atomic number and thus will not be indicative of the nature of the elements under investigation. This is due to the fact that high energy photons are more likely to eject the bound electrons even in the case of heavy elements. If this occurs, the intensity of the scattered radiation will be greater at the lower energy level and may not vary with atomic number. Suitable sources for use in the system of the present invention are americium-241, americium-242, xenon-133, and thulium-170. These are conventional capsuled sources which may be obtained commercially and which respectively emit gamma radiation predominantly at 60 kev., 40 kev., 81 kev., and 84 kev. Another suitable source is iodine-125, which emits X-rays at 27.4 kev.

To direct the radiation into the surface of interest at a predetermined angle, the source 10 is surrounded by shielding material 22 which is provided with an aperture 23 for collimating purposes. The material 22, which may be of lead, absorbs the radiation emitted by the source 10 except that emitted in the direction of the aperture 23. When the system is not in use, a lead plug (not shown) may be inserted in the aperture 23. An additional shield 24, of liquid mercury, in a flexible container 25, of rubber, also is provided between the source and detector 11. Such a shield is desirable since it will conform to the contour of the surface, thereby providing proper shielding even if the surface is uneven. The detector is surrounded by shielding material 26 provided with an aperture 27 for collimating purposes. With this arrangement only the radiation scattered at an angle $\theta$ will be allowed to strike the detector. A desirable scattering angle is 155°.

It is to be understood that a detector such as a solid state radiation detector, which produces pulses having a magnitude proportional to the energy of the radiation detected, may be employed instead of the scintillation crystal 11 and photomultiplier tube 12. Such a detector, for example, may be a reverse-biased semiconductor detector having a sensitive depletion region between p-type and n-type regions.

Referring now to FIGURE 3, a modification of the system of FIGURE 1 is disclosed wherein the formations traversed by a borehole 30 may be analyzed. Like elements have been given like reference characters. The system operates similarly to that of FIGURE 1 with the following exceptions. Source 10 and detector 11 are positioned in a logging instrument 31. The shield 24' may be of lead instead of liquid mercury. The logging instrument is formed of aluminum sections 32 and 33 opposite the source and detector to minimize absorption of radiation. The output of the photomultiplier tube is transmitted to the surface by way of cable 34 which is wound upon drum 35. At the surface, the signals are taken from cable 34 by slip ring and brush arrangement 36 and 37 and applied to analyzers 13 and 14. The logging tool is moved through the borehole by motor 38 coupled to drum 35 by way of mechanical connection 39.

A continuous trace recorder 40 is coupled to system 20 for the production of a continuous trace representative of the variation with depth of the ratio of the intensities at the two energy levels. The chart of the recorder is driven in correlation with depth by measuring element 41 and mechanical connection 42.

In one embodiment, analyzers 13 and 14 may be of the type manufactured by Baird-Atomic, Cambridge, Massachusetts, Model 510. The count rate meters 15 and 16 may be of the type manufactured by Victoreen Instrument Company, 5800 Hough Avenue, Cleveland 3, Ohio, Model No. 489, Thyac II. A suitable circuit 20 for dividing one function into another is disclosed on pages 338 and 339 of Electronic Analog Computers, Granino A. Korn and Theresa M. Korn, McGraw-Hill Book Company, Inc., New York 1956.

Having described the invention, it will be understood that modifications may suggest themselves to those skilled in the art, and it is intended to cover all those as fall within the scope of the appended claims.

What is claimed is:

1. A method of determining the nature of the elements in an environment of interest, comprising the steps of irradiating said environment with radiation of a predetermined energy, said radiation being applied to said environment in a predetermined direction to investigate elements in a zone of interest, detecting radiation scattered by said elements in said zone at a given angle relative to said predetermined direction, selectively producing a first measurement representative of the intensity of said radiation scattered by said elements in said zone and detected at an energy level substantially the same as said predetermined energy, selectively producing a second measurement representative of the intensity of said radiation scattered by said elements in said zone and detected at an energy level less than said predetermined energy and determined in part upon said angle of scattering, and comparing said measurements to determine the nature of the elements in said environment.

2. The method of claim 1 wherein said measurements are made simultaneously.

3. A method of determining the nature of the elements in geological formations, comprising the steps of irradiating said formations with radiation of a predetermined energy, said radiation being applied to said formations in a predetermined direction to investigate elements in a given zone, detecting radiation scattered by said elements in said zone at a given angle relative to said predetermined direction, from said radiation detected producing functions having a magnitude representative of the energy of said radiation detected, from said functions produced selectively producing a first indication representative of the intensity of said detected radiation scattered from said zone and having an energy level substantially the same as said predetermined energy level, from said functions produced selectively producing a second indication representative of the intensity of said detected radiation scattered from said zone and having an energy level less than said predetermined energy and dependent in part upon said angle of scattering, and combining said two indications to determine the nature of the elements in said formations.

4. A method of determining the nature of elements in the formations traversed by a borehole, comprising the steps of passing into said borehole a radioactive source and a radiant energy detector, at a depth of interest irradiating said formations with radiation emitted by said source and having a predetermined energy, said radiation being applied to said formations in a predetermined direction to investigate elements in a given zone, detecting radiation scattered by said elements in said zone at a given angle relative to said predetermined direction, producing a first function representative of the intensity of said detected radiation scattered from said zone and having an energy level similar to said predetermined energy level, producing a second function representative of the intensity of said detected radiation scattered from said zone and having an energy level less than said predetermined energy and dependent in part upon said angle of scattering, and combining said two functions to determine the nature of the elements in said zone.

5. A method of determining the nature of the elements in geological formations, comprising the steps of:
irradiating said formations with radiation of predominantly a single energy at a predetermined level between 20–100 kev.,
said radiation being applied to said formations in a predetermined direction to investigate elements in a given zone,
detecting radiation scattered by said elements in said zone at a given angle relative to said predetermined direction,
selectively measuring the intensity of said radiation scattered by said elements in said zone and detected at an energy level substantially the same as said predetermined energy level, and
selectively measuring the intensity of said radiation scattered by said elements in said zone and detected at an energy level less than said predetermined energy level to determine the nature of the elements in said formation,
said lesser energy level being equal to $$\frac{E}{1+(E/m_0c^2)(1-\cos\theta)}$$

E being the energy of the incident radiation,
$m_0$ being the rest mass of an electron,
$c^2$ being the velocity of light, and
$\theta$ being the angle of scattering.

References Cited by the Examiner

UNITED STATES PATENTS

| 2,781,453 | 2/1957 | Belcher et al. | 250—83.6 |
| 2,997,586 | 8/1961 | Scherbatskoy | 250—71.5 |
| 3,078,370 | 2/1963 | Monaghan | 250—83.3 |

RALPH G. NILSON, *Primary Examiner.*

A. R. BORCHELT, *Examiner.*